(12) United States Patent
Li et al.

(10) Patent No.: US 12,485,001 B2
(45) Date of Patent: Dec. 2, 2025

(54) COVERED STENT

(71) Applicant: SUZHOU ZENITH VASCULAR SCITECH LIMITED, SIP Suzhou (CN)

(72) Inventors: Shuang Li, SIP Suzhou (CN); Liyou Guo, SIP Suzhou (CN); Jie Xia, SIP Suzhou (CN)

(73) Assignee: SUZHOU ZENITH VASCULAR SCITECH LIMITED, SIP Suzhou (CN)

( * ) Notice: Subject to any disclaimer, the term of this patent is extended or adjusted under 35 U.S.C. 154(b) by 656 days.

(21) Appl. No.: 17/914,154

(22) PCT Filed: Apr. 6, 2021

(86) PCT No.: PCT/CN2021/085636
§ 371 (c)(1),
(2) Date: Sep. 23, 2022

(87) PCT Pub. No.: WO2022/068167
PCT Pub. Date: Apr. 7, 2022

(65) Prior Publication Data
US 2023/0125526 A1    Apr. 27, 2023

(30) Foreign Application Priority Data

Sep. 29, 2020 (CN) .......................... 202011052730.8

(51) Int. Cl.
*A61F 2/06* (2013.01)
*A61F 2/07* (2013.01)
(Continued)

(52) U.S. Cl.
CPC .......... *A61F 2/07* (2013.01); *A61F 2002/077* (2013.01); *A61F 2230/0067* (2013.01); *A61F 2250/0039* (2013.01)

(58) Field of Classification Search
None
See application file for complete search history.

(56) References Cited

U.S. PATENT DOCUMENTS

| | | | | |
|---|---|---|---|---|
| 5,064,435 A | * | 11/1991 | Porter | A61F 2/90 606/198 |
| 8,545,549 B2 | * | 10/2013 | Hartley | A61F 2/07 623/1.13 |

(Continued)

FOREIGN PATENT DOCUMENTS

| CN | 205286610 U | 6/2016 |
|---|---|---|
| CN | 106937895 A | 7/2017 |

(Continued)

OTHER PUBLICATIONS

First Office Action for Chinese Application No. 202011052730.8, dated Jul. 5, 2024, 6 pages.

(Continued)

*Primary Examiner* — Ann Hu
(74) *Attorney, Agent, or Firm* — Dickinson Wright PLLC

(57) ABSTRACT

A covered stent (20) is provided, including a stent body (21) and a filter membrane (22). The stent body (21) has a proximal end (211) and a distal end (212). The proximal end (211) is configured to be arranged upstream in the blood vessel with respect to the distal end (212). The filter membrane (22) has a mounting portion (222) and a free portion (221). The mounting portion (222) is connected with the stent body (21), and the free portion (221) is connected with the mounting portion (222) and free from the stent body (21).

7 Claims, 9 Drawing Sheets

(51) Int. Cl.
*A61F 2/82* (2013.01)
*A61F 2/88* (2006.01)

(56) References Cited

U.S. PATENT DOCUMENTS

| | | | |
|---|---|---|---|
| 11,446,168 B2* | 9/2022 | Roeder | A61F 2/915 |
| 2001/0049554 A1* | 12/2001 | Ruiz | A61F 2/07 623/1.35 |
| 2005/0131515 A1* | 6/2005 | Cully | A61F 2/07 623/1.13 |
| 2012/0296406 A1* | 11/2012 | Minion | A61F 2/07 623/1.11 |
| 2015/0196383 A1* | 7/2015 | Johnson | A61F 2/07 623/1.13 |

FOREIGN PATENT DOCUMENTS

| | | | | |
|---|---|---|---|---|
| CN | 206836995 U | | 1/2018 | |
| CN | 108156810 A | | 6/2018 | |
| CN | 207590805 U | | 7/2018 | |
| CN | 108836584 A | | 11/2018 | |
| CN | 108836585 A | | 11/2018 | |
| CN | 208229020 U | * | 12/2018 | |
| CN | 208339633 U | | 1/2019 | |
| CN | 109730804 A | * | 5/2019 | |
| CN | 109998749 A | * | 7/2019 | A61F 2/90 |
| CN | 112022432 A | | 12/2020 | |
| CN | 212369121 U | | 1/2021 | |
| WO | WO-2006017968 A1 | * | 2/2006 | A61F 2/07 |
| WO | WO-2014107748 A2 | * | 7/2014 | A61F 2/07 |

OTHER PUBLICATIONS

English Translation of First Office Action for Chinese Application No. 202011052730.8, dated Jul. 5, 2024, 5 pages.

International Search Report and Written Opinion for PCT Application No. PCT/CN2021/085636, dated Jun. 30, 2021, pp. 1-10.

* cited by examiner

COVERED STENT

CROSS-REFERENCE TO RELATED APPLICATION(S)

This present application is a national stage application of International Patent Application No. PCT/CN2021/085636, filed Apr. 6, 2021, which claims priority to Chinese Patent Application No. 202011052730.8 filed on Sep. 29, 2020, the disclosures of which are incorporated herein by reference in their entireties.

TECHNICAL FIELD

The application belongs to the technology field of medical devices, for example, relates to a covered stent.

BACKGROUND

Cerebrovascular disease is a major disease threatening human health and is the third leading cause of death following cardiovascular disease and tumor. 25% patients with ischemic stroke refer to carotid artery stenosis or occlusion.

Carotid artery stenosis is mainly treated by drug therapy, carotid endarterectomy and carotid artery stenting. With the advantages of simple operation, less trauma and less complications, carotid artery stenting is one of the effective methods for treating carotid artery stenosis.

Carotid artery includes common carotid artery, external carotid artery and internal carotid artery. The common carotid artery, the external carotid artery and the internal carotid artery forms a Y-shaped bifurcation structure, and the blood in the common carotid artery flows into the internal carotid artery and the external carotid artery at the bifurcation structure. The blood in the internal carotid artery mainly flows to the brain, while the blood in the external carotid artery is mainly supplied for facial organs.

In the related art, the common carotid artery stents include bare stents and covered stents. When the carotid artery stents are placed in the common carotid artery and the internal carotid artery, the carotid artery stents expand so that the narrow blood vessels are expanded and restore normal blood supply in the carotid artery.

The bare stents in the related art are usually a cylindrical structure formed by laser cutting or metal wire weaving, with a large mesh aperture. When the bare stent is released in the carotid artery stenosis, the stent rod tends to cut the plaque and cause the plaque to break and fall off. The broken plaques fallen off enters the brain with the blood flow, and then block the cerebral blood vessels, causing stroke and even death.

The covered stents in the related art are mounted at the Y-shaped bifurcation structure of the carotid artery. The filter membrane of the covered stents can easily cover the entrance of the external carotid artery, resulting in ischemia of the external carotid artery and affecting blood supply of facial organs.

In conclusion, the carotid artery stents in the related art are of low safety.

SUMMARY

A covered stent is provided to solve the problem of low safety of carotid artery stents in the related art.

The following technical solutions are adopted in the application:

Provided is a covered stent including a stent body and a filter membrane.

The stent body has a proximal end and a distal end. The proximal end is configured to be arranged upstream in the blood vessel with respect to the distal end.

The filter membrane has a mounting portion and a free portion. The mounting portion is connected with the stent body, and the free portion is connected with the mounting portion and free from the stent body.

Figure 1:
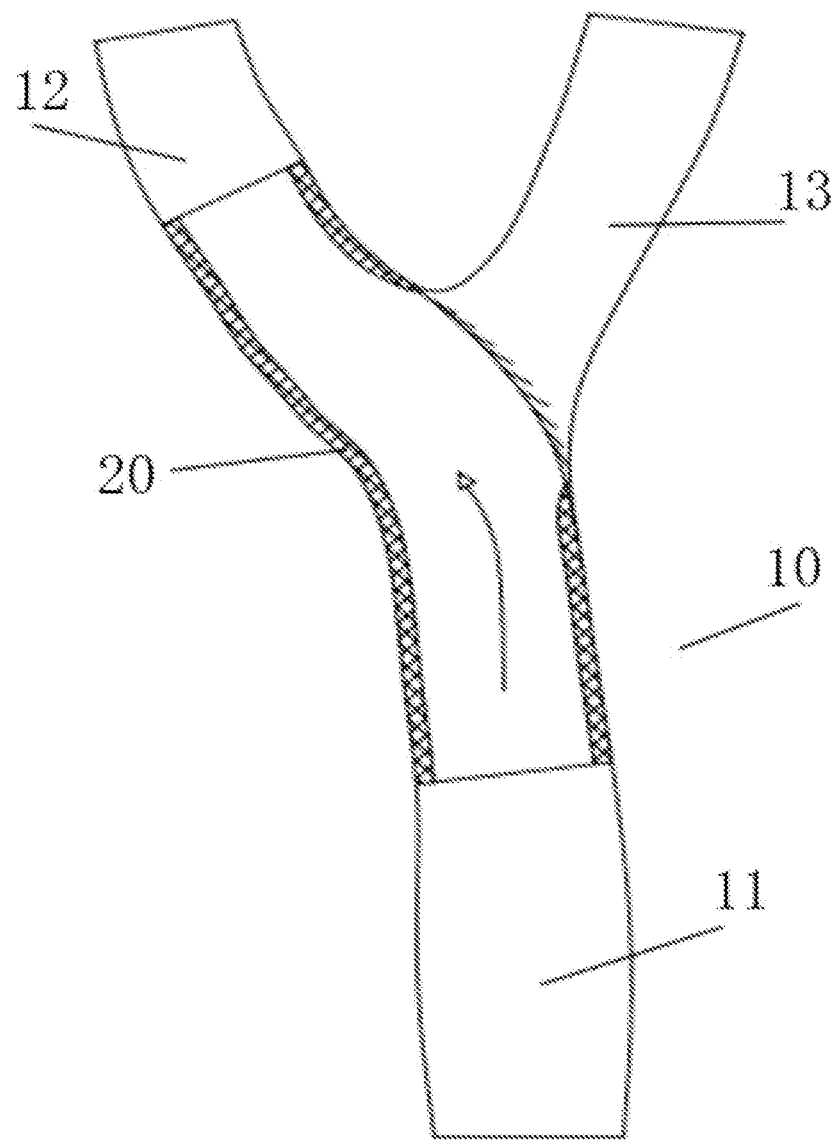
FIG. 1 is a diagram illustrating an initial state of a covered stent released in a carotid artery according to the embodiment one of the application.

REFERENCE LIST 10 carotid artery
11 common carotid artery
12 internal carotid artery
13 external carotid artery
20 covered stent
21 stent body
211 proximal end
212 distal end
22 filter membrane
221 free portion
222 mounting portion
223 partial body
30 guide tube

DETAILED DESCRIPTION

Detailed description of the present application is made below in conjunction with the figures and the embodiments. It can be understood that the embodiments described herein are only used to explain the application. It should also be noted that for the purpose of description, the figures only show some parts related to the application, but not the structure in whole.

In description of the present application, unless otherwise expressly specified and limited, the terms "connected", "connect", and "fixed" should be interpreted broadly. For example, it may be a fixed connection, a detachable connection, or a connection into a whole; a mechanical connection or an electrical connection; a direct connection or indirect connection through an intermediate medium, an internal connection of two elements or the interaction between two elements. For those of ordinary skilled in the art, the meanings of the above terms in the application can be understood depending on conditions.

In the application, unless otherwise expressly specified and limited, the case where the first feature is "on" or "under" the second feature may include the direct contact between the first and second features, and may also include other feature contact rather than direct contact between the first and second features. And the case where the first feature is "above", "over", and "on" the second feature indicates that the first feature is right and obliquely above the second feature, or only that the first feature is higher in level than the second feature. And the case where the first feature is "below", "under", and "underneath" the second feature indicates that the first feature is right and obliquely below the second feature, or only that the first feature is lower in level than the second feature.

In description of the present embodiment, "up", "down", "right" and other terms describing orientations or positions are based on the orientations or positions shown in the figures. They are used only for convenient description and simplified operation, rather than indicating or implying that the device or element referred to must stay in a position, or be constructed and operated in an orientation. Besides, the terms "first" and "second" are used only for the purpose of distinguishing in description, with no special meaning.

Embodiment One

Figure 2:
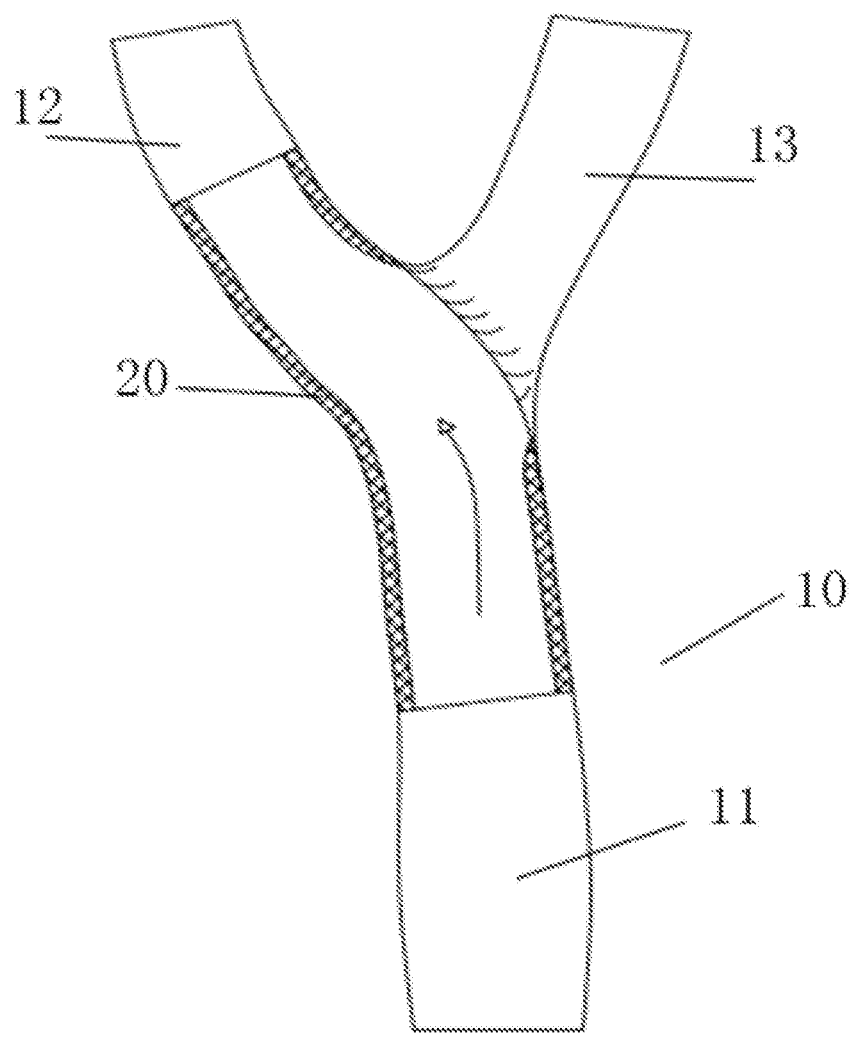
FIG. 2 is a diagram illustrating a state of a covered stent after being released in a carotid artery according to the embodiment one of the application.

FIG. 1 is a diagram illustrating an initial state of a covered stent 20 released in a carotid artery 10 according to the embodiment one of the application. FIG. 2 is a diagram illustrating a state of a covered stent 20 after being released in a carotid artery 10 according to the embodiment one of the application.

As shown in FIGS. 1 and 2, carotid artery 10 includes a common carotid artery 11, an internal carotid artery 12 and an external carotid artery 13. The common carotid artery 11, the internal carotid artery 12 and the external carotid artery 13 form a Y-shaped bifurcation structure. The blood in the common carotid artery 11 flows into the internal carotid artery 12 and the external carotid artery 13 at the Y-shaped bifurcation structure. The blood in the internal carotid artery 12 mainly flows to the brain, while the blood in the external carotid artery 13 mainly supplies for facial organs. There are plaques in the common carotid artery 11 and the internal carotid artery 12, which lead to vascular stenosis and prevents blood from flowing. Therefore, it is necessary to implant a covered stent at the lesion to expand the blood vessels so that blood normally flows through the blood vessels. However, when the stent in the related art is placed in the carotid artery 10, the plaque tends to be broken by the compression of the stent rod, and the broken plaque enters the brain as the blood flows and blocks the cerebral vessels.

The covered stent 20 of the application is mounted in the common carotid artery 11 and the internal carotid artery 12 at the Y-shaped bifurcation structure to ensure that blood normally flows and thrombi is prevented from flowing downstream in the blood vessel.

Figure 3:
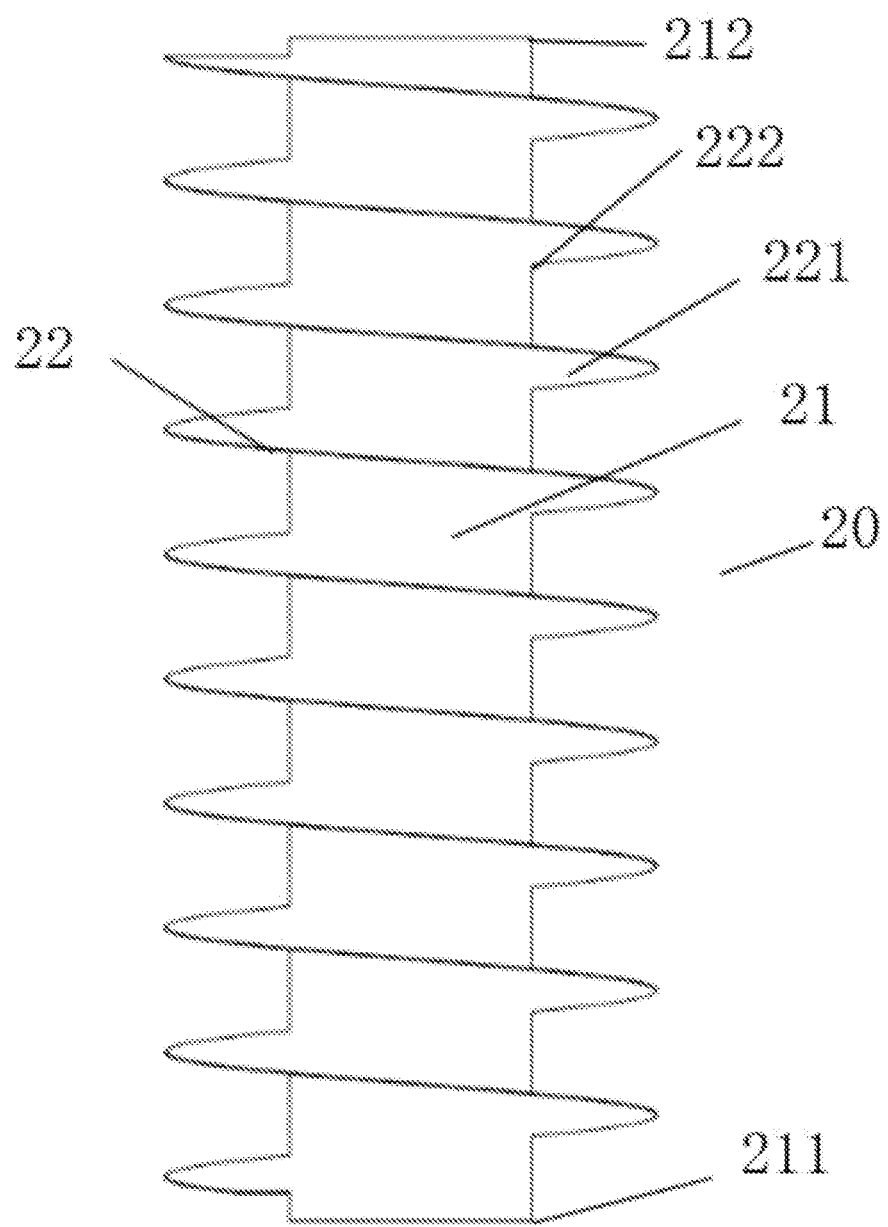
FIG. 3 is a diagram illustrating a structure of a covered stent according to the embodiment one of the application.
Figure 4:
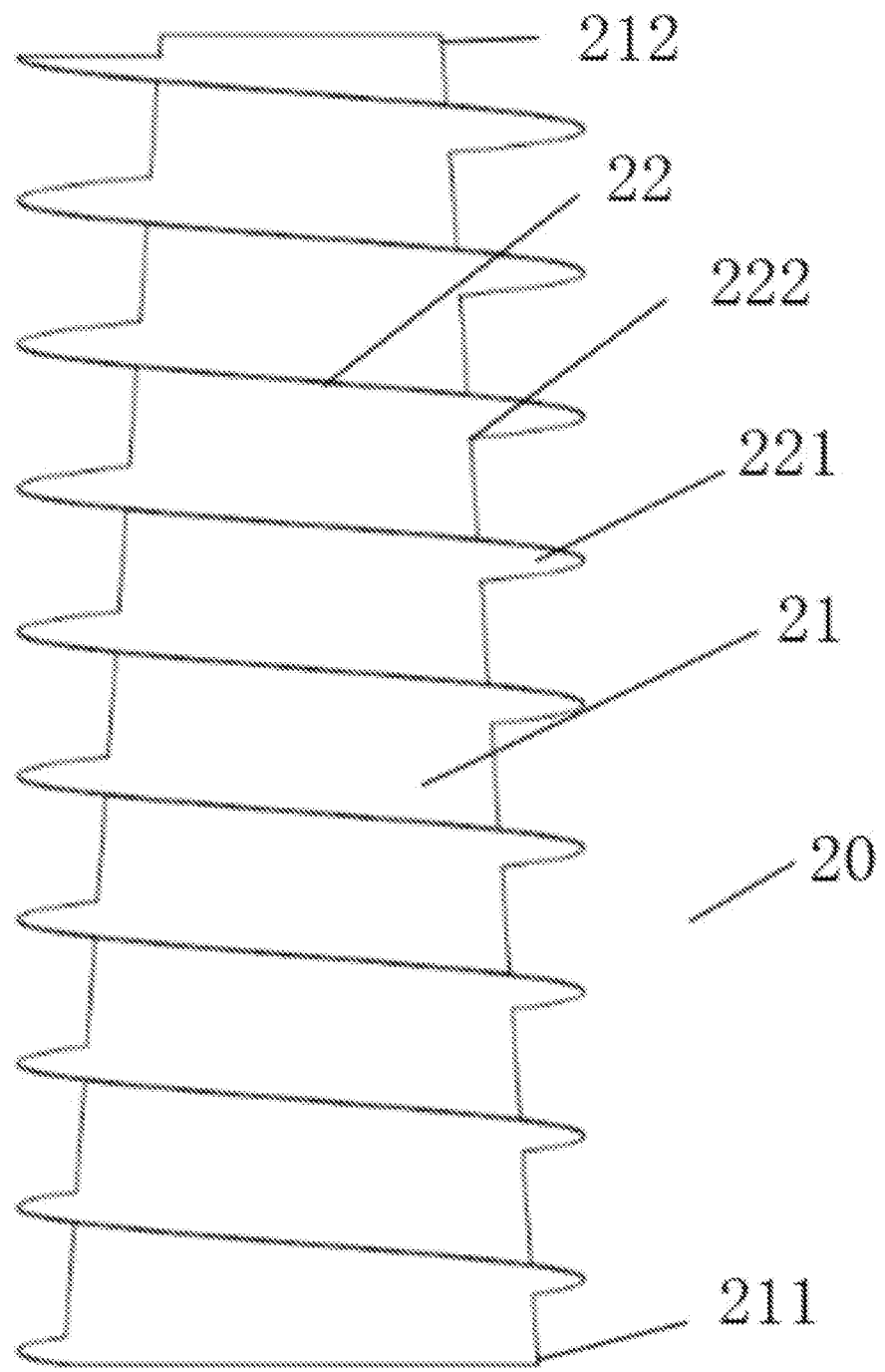
FIG. 4 is a diagram illustrating a structure of another covered stent according to the embodiment one of the application.

FIG. 3 is a diagram illustrating a structure of a covered stent 20 according to the embodiment one of the application. FIG. 4 is a diagram illustrating a structure of another covered stent 20 according to the embodiment one of the application. As shown in FIGS. 3 and 4, the embodiment discloses a covered stent 20. The covered stent 20 includes a stent body 21 and a filter membrane 22. The stent body 21 has a proximal end 211 and a distal end 212. The proximal end 211 is configured to be arranged upstream in the blood vessel with respect to the distal end 212. The filter membrane 22 has a mounting portion 222 and a free portion 221. The mounting portion 222 is connected with the stent body 21, and the free portion 221 is connected with the mounting portion 222 and free from the stent body 21. The free portion 221 refers to a portion which is not connected with the stent body 21, and the free portion 221 can deviate from the stent body 21.

When the stent body 21 of the covered stent 20 of the application is mounted at the Y-shaped bifurcation structure of the carotid artery 10, the stent body 21 expands, and the filter membrane 22 is expanded by the stent body 21. The filter membrane 22 covers the plaque in the blood vessel, thus preventing the plaque from being broken and falling off under the extrusion of the stent body 21. In an embodiment, the filter membrane 22 presses the plaque on the inner wall of the blood vessel. The filter membrane 22 increases the stressed area of the plaque, so that the plaque is less likely to break. Even if the plaque is detached from the inner wall of the blood vessel, the plaque does not fall off and flow downstream in the blood vessel because of existence of the filter membrane 22.

Besides, the blood flowing from the common carotid artery 11 to the external carotid artery 13 tends to thrust through the filter membrane 22 located at the entrance of the external carotid artery 13 when the stent body 21 is mounted in the common carotid artery 11 and internal carotid artery 12, thus ensuring that the blood flows into the external carotid artery 13 normally.

In conclusion, the covered stent 20 of the application provides better safety during usage compared with the related art.

The distance between the free portion 221 and the proximal end 211 is less than the distance between the mounting portion 222 and the proximal end 211 in this embodiment, that is, the mounting portion 222 is closer to the distal end 212 than the free portion 221. With this configuration, delivering the covered stent 20 to the lesion site, and withdrawing and then re-releasing the covered stent 20 are facilitated. In other embodiments, the free portion 221 may also be located closer to the distal end 212 than the mounting portion 222.

It is simple to mount the covered stent 20 in the carotid artery 10 in this embodiment, and there is no need to locate the entrance of the external carotid artery 13.

In an embodiment, the stent body 21 can be made of medical metal pipes and by laser cutting. Medical metal materials include medical stainless steel, nickel titanium alloy, cobalt base alloy, titanium alloy or magnesium alloy etc. The filter membrane 22 can be made of polymer wire by weaving. The filter membrane 22 in this embodiment is a layer of thin film.

The surface of the filter membrane 22 in this embodiment which can better obstruct broken plaques in the blood may not be laser drilled or grid cut. Endothelial cells can pass through the filter membrane 22.

The filter membrane 22 in this embodiment can also be a grid structure made by laser cutting polymer membranous materials. Holes of different shapes, such as a circle, a square, a rectangle, a triangle, a diamond and an ellipse, can be cut on the membranous materials according to the need.

Figure 10:
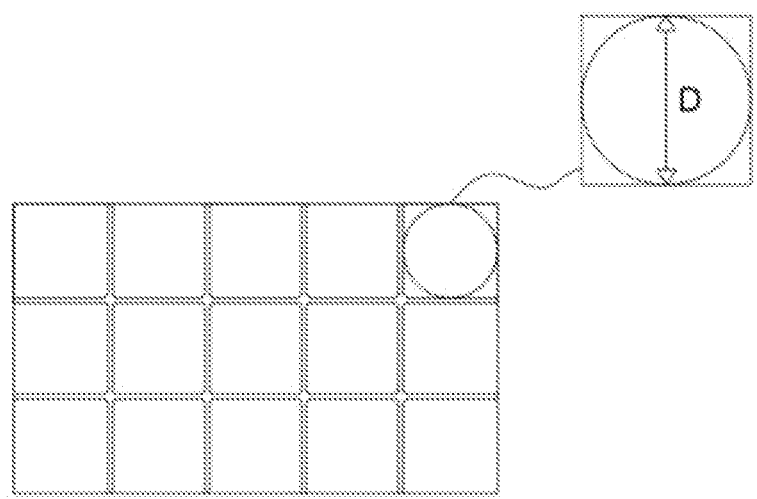
FIG. 10 illustrates a filter membrane having a first kind of mesh in embodiment one and embodiment two of the application.
Figure 11:
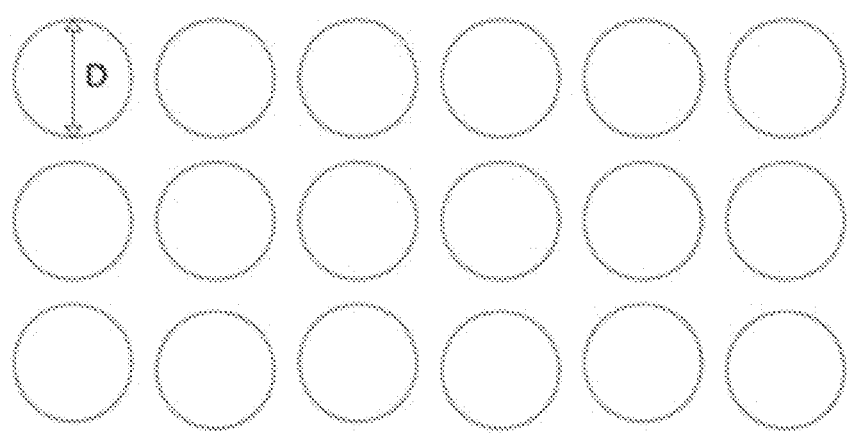
FIG. 11 illustrates filter membrane having a second kind of mesh in embodiment one and embodiment two of the application.
Figure 12:
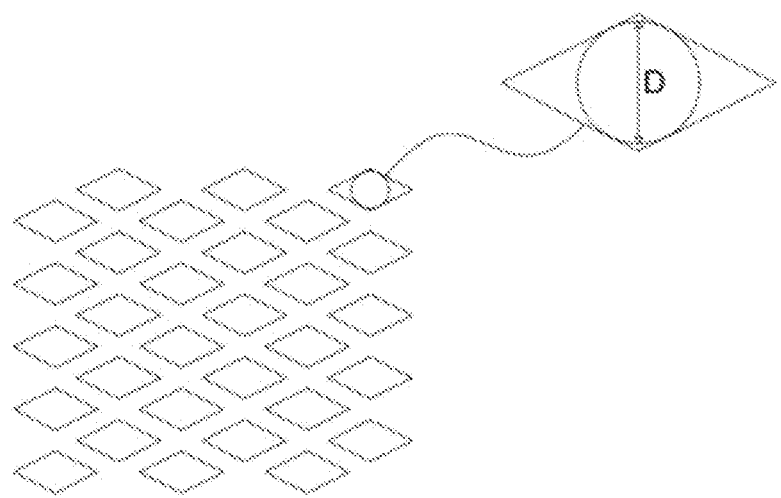
FIG. 12 illustrates a filter membrane having a third kind of mesh in the embodiment one and embodiment two of the application.

FIG. 10 illustrates a filter membrane 22 having a first kind of mesh in embodiment one and embodiment two of the application; FIG. 11 illustrates filter membrane 22 having a second kind of mesh in embodiment one and embodiment two of the application; FIG. 12 illustrates a filter membrane 22 having a third kind of mesh in the embodiment one and embodiment two of the application; As shown in FIGS. 10 to 12, the meshes are square, circular or diamond respectively. The filter membrane 22 is about 10 μm to 200 μm in thickness. The opening size of the non-circular mesh is calculated according to the diameter D of the inscribed circle of the mesh. The diameter D of the inscribed circle of the mesh is about 30 μm to 500 μm.

The mounting portion 222 of the filter membrane 22 can be connected to the outer surface of the stent body 21 by hot pressing, laser welding, bonding with glue, ultrasonic welding or sewing with wires and needles.

In other embodiments, the filter membrane 22 is shaped by heat treatment. The step of shaping by heat treatment includes fixing the filter membrane 22 on the shaper and performing heat treatment performed at a temperature ranging from 100 to 300° C. for a time ranging from 15 s to 10 min to get the final shape. The filter membrane 22 is made of medical polymer wire by weaving or made of polymer sheet by laser cutting. Medical polymer materials include medical chitin, medical fibrin, medical polyglycolic acid, medical polylactic acid, ePTFE, PET, PU, PEEK and PE etc.

As shown in FIG. 3, alternatively, the stent body 21 is cylindrical. Alternatively, as shown in FIG. 4, the stent body 21 is conical. Alternatively, the structure of the stent body 21 is subject to the vascular diameter.

Alternatively, the filter membrane 22 is elongated and spirally wound around the stent body 21 along the axial direction of the stent body 21. In the width direction of the filter membrane 22, the inner side of the elongated filter membrane 22 is connected with the stent body 21 and forms the spirally extended mounting portion 222, and the outer side of the elongated filter membrane 22 forms the spirally extended free portion 221.

Alternatively, width of the filter membrane 22 is 0 to 5 mm larger than the thread pitch of the filter membrane 22.

Figure 5:
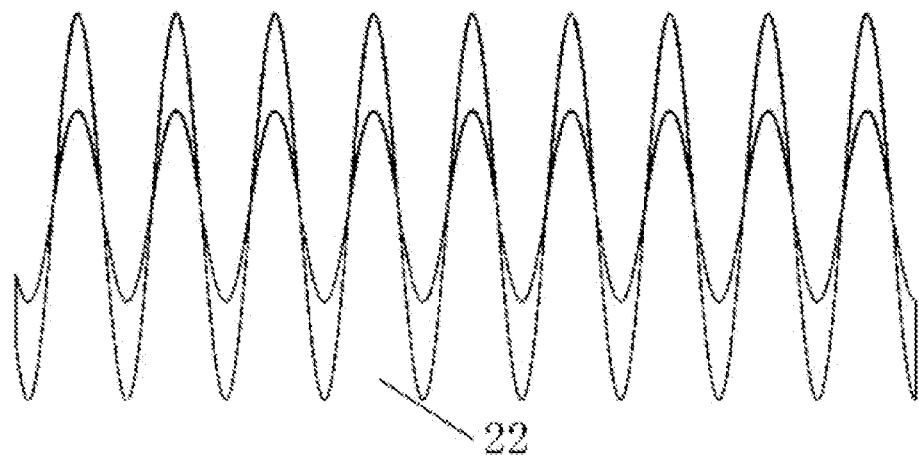
FIG. 5 is a schematic diagram illustrating a structure of a filter membrane of a covered stent according to the embodiment one of the application.

FIG. 5 is a schematic diagram illustrating a structure of a filter membrane 22 of a covered stent 20 according to the embodiment one of the application. As shown in FIG. 5, the filter membrane 22 is elongated before being mounted to the stent body 21.

Figure 6:
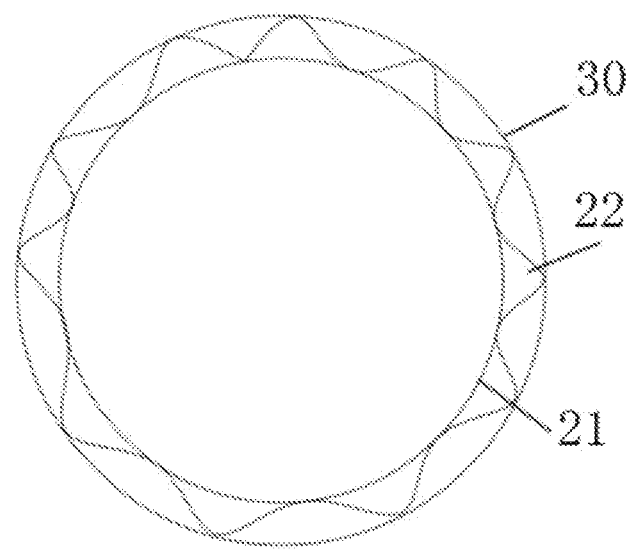
FIG. 6 is a diagram illustrating a state of an end face of a covered stent compressed in a guide tube according to the embodiment one of the application.

FIG. 6 is a diagram illustrating a state of an end face of a covered stent 20 compressed in a guide tube 30 according to the embodiment one of the application. When the covered stent 20 is located in the guide tube 30, the filter membrane 22 tightly wraps the surface of the stent body 21 in a certain arrangement order. When the covered stent 20 reaches the predetermined position in the blood vessel and is released, the filter membrane 22 is expanded by the stent body 21. The guide tube 30 belongs to a delivery unit. The delivery unit is used to deliver the covered stent 20 to the predetermined position in the blood vessel, and then release the covered stent 20.

Embodiment Two

Figure 7:
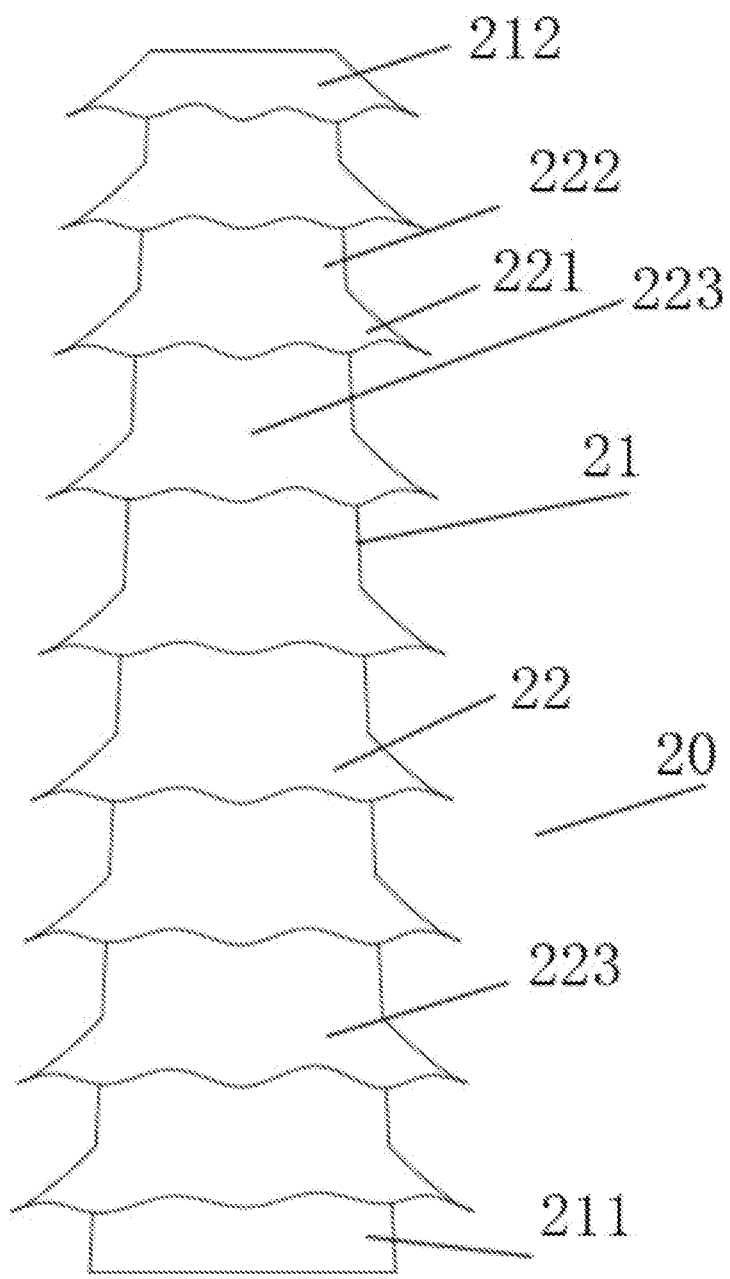
FIG. 7 is a diagram illustrating a structure of a covered stent according to the embodiment two of the application.

FIG. 7 is a diagram illustrating a structure of a covered stent 20 according to the embodiment two of the application. As shown in FIG. 7, it is as same as the embodiment one that the embodiment discloses a covered stent 20. The covered stent 20 includes a stent body 21 and a filter membrane 22. The stent body 21 has a proximal end 211 and a distal end 212. The proximal end 211 is configured to be arranged upstream in the blood vessel with respect to the distal end 212. The filter membrane 22 has a mounting portion 222 and a free portion 221. The mounting portion 222 is connected with the stent body 21, and the free portion 221 is connected with the mounting portion 222 and free from the stent body 21.

When the stent body 21 of the covered stent 20 of the application is mounted at the Y-shaped bifurcation structure of the carotid artery 10, the stent body 21 expands, and the filter membrane 22 is expanded by the stent body 21. The filter membrane 22 covers the plaque in the blood vessel, thus preventing the plaque from being broken and falling off under the extrusion of the stent body 21. In an embodiment, the filter membrane 22 presses the plaque on the inner wall of the blood vessel. The filter membrane 22 increases the stressed area of the plaque, so that the plaque is less likely to break. Even if the plaque is detached from the inner wall of the blood vessel, the plaque does not fall off and flow downstream in the blood vessel because of existence of the filter membrane 22.

Besides, the blood flowing from the common carotid artery 11 to the external carotid artery 13 tends to thrust through the filter membrane 22 located at the entrance of the external carotid artery 13 when the stent body 21 is mounted in the common carotid artery 11 and internal carotid artery 12, thus ensuring that the blood flows into the external carotid artery 13 normally.

In conclusion, the covered stent 20 of the application provides better safety during usage compared with the related art.

It is different from the embodiment one that, alternatively, the filter membrane 22 includes at least two annular partial bodies 223, where the at least two partial bodies 223 are distributed along the axial direction of the stent body 21. A first end of each of the partial bodies 223 is connected with the stent body 21 and forms the annular mounting portion 222, and a second end of each of the partial bodies 223 forms the annular free portion 221.

Alternatively, the free portion 221 of one partial body 223 can cover the mounting portion 222 of another partial body 223 adjacent to the one partial body 223.

Figure 9:
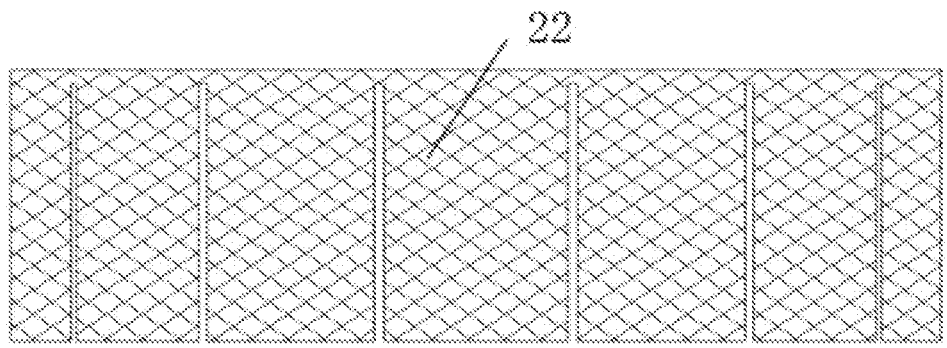
FIG. 9 is an expanded view of a filter membrane of another covered stent according to the embodiment two of the application.

FIG. 9 is an expanded view of a filter membrane 22 of another covered stent 20 according to the embodiment two of the application. As shown in FIG. 9, alternatively, the partial body 223 is an annular structure, and the free portion 221 of one partial body 223 can cover the mounting portion 222 of another partial body 223 adjacent to the one partial body 223 by a distance of 0 to 5 mm in the axial direction, ensuring that the filter membrane 22 can completely cover the stent body 21.

Figure 8:
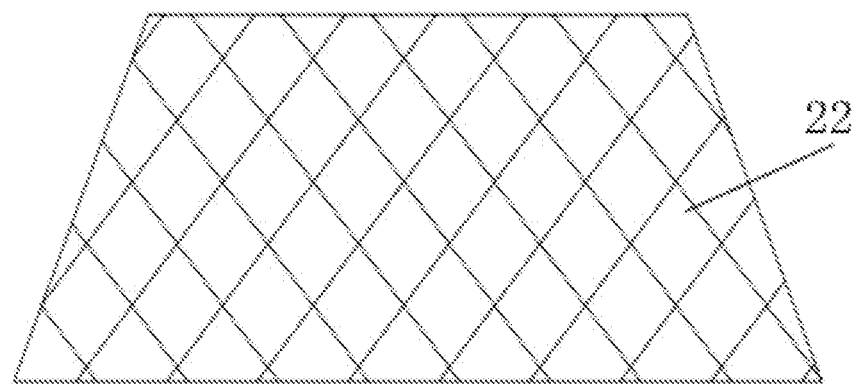
FIG. 8 is an expanded view of the filter membrane of the covered stent in FIG. 7.

FIG. 8 is an expanded view of the filter membrane 22 of the covered stent 20 in FIG. 7. As shown in FIG. 8, alternatively, the partial body 223 is a conical and annular structure, and the diameter of the mounting portion 222 is smaller than the diameter of the free portion 221.

As shown in FIG. 2, alternatively, the free portion 221 has an incision extending in the axial direction of the stent body 21, and when the free portion 221 is impacted by blood, the incision opens. That is, the incision is impacted by blood. With this configuration, the blood can normally enter the external carotid artery 13.

Alternatively, the width of one partial body 223 located in the middle of the stent body 21 is smaller than the widths of other partial bodies 223 located at the proximal end 211 and the distal end 212. The middle of the stent body 21 is opposite to the entrance of the external carotid artery 13. The width of the partial body 223 located in the middle of the stent body 21 is arranged to be smaller, facilitating more blood to flow into the external carotid artery 13 through the filter membrane 22.

In the application, when the stent body of the covered stent is mounted at the Y-shaped bifurcation structure of the carotid artery, the stent body expands, and the filter membrane is expanded by the stent body. The filter membrane covers the plaque in the blood vessel, thus preventing the plaque from being broken and falling off under the extrusion of the stent body. In an embodiment, the filter membrane presses the plaque on the inner wall of the blood vessel, so that the plaque does not fall off and flow downstream in the blood vessel because of the existence of the filter membrane even if the plaque is detached from the inner wall of the blood vessel.

Besides, the blood flowing from the common carotid artery to the external carotid artery tends to thrust through the filter membrane at the entrance of the external carotid artery when the stent body is mounted in the common carotid artery and internal carotid artery, thus ensuring that the blood flows into the external carotid artery normally.

In conclusion, the covered stent of the application provides better safety during usage compared with the related art.

What is claimed is:

1. A covered stent, comprising:
    a stent body, having a proximal end and a distal end, wherein the proximal end is configured to be arranged upstream in a blood vessel with respect to the distal end; and
    a filter membrane, having a mounting portion and a free portion, wherein the mounting portion is connected with the stent body, and the free portion is connected with the mounting portion and free from the stent body;
    wherein the filter membrane comprises at least two annular partial bodies distributed along an axial direction of the stent body, wherein a first end of each of the at least two partial bodies is connected with the stent body, a first end of each of the at least two partial bodies form the mounting portion which is annular, and a second end of each of the at least two partial bodies forms the free portion which is annular;
    wherein among the at least two annular partial bodies, the free portion of one partial body is configured to cover the mounting portion of another annular partial body adjacent to one of the at least two annular partial bodies; and
    wherein the free portion is provided with an incision extending in the axial direction of the stent body, wherein the incision is configured to open to allow blood to pass through the free portion when the free portion is impacted by the blood.

2. The covered stent according to claim 1, wherein the stent body is cylindrical or conical.

3. The covered stent according to claim 1, wherein the filter membrane is elongated and spirally wound around the stent body along an axial direction of the stent body, an inner side of the filter membrane is connected with the stent body, the inner side of the filter membrane forms the mounting portion extending spirally, and an outer side of the filter membrane forms the free portion extending spirally.

4. The covered stent according to claim 3, wherein a width of the filter membrane is 0 to 5 mm larger than a thread pitch of the filter membrane.

5. The covered stent according to claim 1, wherein the free portion of one annular partial body is configured to cover the mounting portion of another annular partial body adjacent to the one annular partial body by a coverage distance ranging from 0 to 5 mm in the axial direction of the stent body.

6. The covered stent according to claim 1, wherein each of the at least two annular partial bodies is a conical structure, and a diameter of the mounting portion of each of the at least two annular partial bodies is smaller than a diameter of the free portion of each of the at least two annular partial bodies.

7. The covered stent according to claim 1, wherein among the at least two annular partial bodies, a width of one annular partial body located in a middle of the stent body is smaller than a width of another annular partial body located at the proximal end or the distal end of the stent body.

* * * * *